US006562385B2

(12) United States Patent
Neumann

(10) Patent No.: US 6,562,385 B2
(45) Date of Patent: May 13, 2003

(54) FOOD PRODUCT WITH FLAVORING AND METHOD FOR PRODUCING THE SAME

(75) Inventor: Paul Eugene Neumann, San Antonio, TX (US)

(73) Assignee: C.H. Guenther & Son, Inc., San Antonio, TX (US)

( * ) Notice: Subject to any disclaimer, the term of this patent is extended or adjusted under 35 U.S.C. 154(b) by 13 days.

(21) Appl. No.: 09/750,466

(22) Filed: Dec. 28, 2000

(65) Prior Publication Data

US 2001/0007689 A1 Jul. 12, 2001

Related U.S. Application Data

(60) Division of application No. 09/422,254, filed on Oct. 21, 1999, now abandoned, which is a continuation-in-part of application No. 09/188,435, filed on Nov. 9, 1998, now abandoned.
(60) Provisional application No. 60/105,938, filed on Oct. 28, 1998.

(51) Int. Cl.⁷ ............................................. A21D 13/08
(52) U.S. Cl. ..................... 426/94; 426/529; 426/289; 426/650; 426/496
(58) Field of Search ........................ 426/94, 95, 144, 426/618, 549, 138, 100, 101, 283, 289, 650, 496

(56) References Cited

U.S. PATENT DOCUMENTS

| | | |
|---|---|---|
| 3,671,264 A | 6/1972 | Drews et al. ................. 99/94 |
| 3,719,138 A | 3/1973 | Blaetz et al. ................. 99/192 |
| 3,793,938 A | 2/1974 | Haas ........................ 99/450.6 |
| 3,867,559 A | 2/1975 | Haas ........................... 426/283 |
| 3,983,256 A | 9/1976 | Norris et al. ................. 426/94 |
| 4,112,125 A | 9/1978 | Chesnut et al. ............. 426/250 |
| 4,226,895 A | 10/1980 | Miller et al. ................ 426/658 |
| 4,874,618 A | 10/1989 | Seaborne et al. ............. 426/76 |
| 4,927,655 A | 5/1990 | Ito ............................. 426/549 |
| 4,935,252 A | 6/1990 | Juang et al. ................. 426/107 |

FOREIGN PATENT DOCUMENTS

GB        1292760 A    10/1972    ............. A23L/1/00

OTHER PUBLICATIONS

Cereal and Bakery Products, vol. 8, No. 10, 1974, pp. 24, 27.
Pegi USA Inc.; A Gourmet Experience in the Belgian Tradition; 1997.
Snack & Bakery Foods; SNAK–A–FFLES; Jun. 1997; p. 20.

*Primary Examiner*—Nina Bhat
(74) *Attorney, Agent, or Firm*—Locke Liddell & Sapp LLP

(57) ABSTRACT

A food products that can be reconstituted for consumption includes flavoring toppings and/or flavoring inclusions that closely simulate commercially available flavored table syrups and flavored toppings in appearance, flavor, and texture. By applying these flavorings, such as flavored syrups, flavored toppings, and/or flavored inclusions, to chemically leavened food products, yeast leavened food products, and unleavened food products, including waffles, pancakes, corn breads, wafers, pastries, cookies, and the like, prior to freezing, the reconstituted food product closely simulates food products comprising commercially available flavored syrups or flavored toppings.

37 Claims, 9 Drawing Sheets

FOOD PRODUCT WITH FLAVORING AND METHOD FOR PRODUCING THE SAME

This is a division of U.S. patent application Ser. No. 09/422,254, filed Oct. 21, 1999, now abandoned which, in turn, is a continuation-in-part of U.S. patent application Ser. No. 09/188,435, filed Nov. 9, 1998, now abandoned, which, in turn, claims the benefit of U.S. Provisional Patent Application Ser. No. 60/105,938, filed Oct. 28, 1998.

FIELD OF THE INVENTION

This invention generally relates to food products that can be reconstituted for consumption and methods of making them. Flavorings, including syrups, flowable toppings, and/or fruits are added to pre-baked cereal-based products, such as waffles, pancakes, corn breads, or other food products, prior to commercial distribution or at the point of consumption. When heated, these ready-to-eat food products have a taste, appearance, and texture similar to cooked cereal-based products prepared by conventional methods. This invention improves the identity, convenience, and portability of the food product for consumers, allowing them to enjoy the sensory attributes of flavored syrups and flavored toppings and makes it easier for quick service restaurants to prepare and deliver the food products to the consumer.

BACKGROUND OF THE INVENTION

Consumers have previously not been able to enjoy convenient and portable food products with flavored syrup or flavored flowable topping. With the rise in consumer need for convenience foods that simulate homemade, traditional meal selections, there is a significant need for frozen, refrigerated, or shelf-stable precooked foods that can be served from a variety of vendors, namely quick service restaurants, that allow consumers to "eat-on-the-go." Consumers using "eat-on-the-go" products enjoy the portable convenience of consuming food products in their vehicles or during other activities.

Prior to the present invention, however, vendors have been limited to offering traditional favorite meals such as pancakes, waffles, corn breads, or other food products with flavored syrups as plated meals for a traditional, "sit-down" consumption. Additionally, these food products have required the use of eating utensils including knives and forks. The prior art required the consumer to grapple with a separate packet or container of syrup or flavored topping and to apply this flavored syrup or flavored topping to the food product. Alternatively, consumers have been forced to endure flavored syrups or flavored toppings that possessed significantly thickened viscosities or unacceptable imitations such as gels, gums, icings, frostings, or glazes, thus destroying any identity as flavored syrups or flavored flowable toppings.

Manufacturers of food products thus face two major problems. First, the prior art has failed in providing an effective method for applying commercially available flavored table syrups and flavored toppings to food products in a manner such that these flavored syrups and flavored toppings do not significantly absorb into the crust and/or crumb either prior to or after reconstitution. This absorption destroyed the flavoring's identity. Second, the prior art has failed to show an effective method for developing and applying a flavoring that delivers the visual, flavored, and textural identity of a flavored syrup or flavored topping after reconstitution without dripping or otherwise making a sticky mess that would hamper the portable convenience of the food product.

SUMMARY OF THE INVENTION

The present invention overcomes these shortcomings of the prior art. In one embodiment, a plurality of flavoring inclusions that closely resemble droplets of commercially available table syrup may be interspersed within an interior crumb of the food product. Additionally or alternatively, in another embodiment, a flavoring may be applied to an exteriormost surface of the food product. This flavoring is not absorbed into a crust or crumb of the food product before, during, or after reconstitution of the food product. Moreover, the flavoring simulates a flavored table syrup or flavored topping after reconstitution. After reconstitution, the flavoring does not run or drip if eaten cut, sliced, tilted, or inverted for short periods. The present invention thus offers consumers traditional meals including pancakes, waffles, corn breads, and other related food products, including chemically leavened, yeast leavened, and unleavened food products, with flavoring toppings and/or flavoring inclusions while not forcing the consumer to grapple with separate containers or cumbersome eating utensils. Therefore, the present invention offers a portable convenience while delivering an authentic, traditional meal experience that captures consumers' desire for the appearance, flavor, and eating texture of flavored syrup while obviating the mess and inconvenience of having to add a flavored syrup or a flavored topping from a separate container. The present invention also includes methods of making the food product with either flavoring toppings or flavoring inclusions or with both. The concept and features of the present invention, however, are broad in scope in that the characteristic properties of both the flavoring toppings and the flavoring inclusions themselves can be applied, marketed, and sold separately for use in manufacturing or consumer preparation of food products.

The foregoing has outlined rather broadly the features and advantages of several embodiments of the present invention so that the detailed description of the invention that follows may be better understood. Additional features and advantages of the invention will be described hereinafter which form the subject of the claims of the invention. It should be appreciated by those skilled in the art that the conception and the specific embodiments disclosed may be readily used as a basis for modifying or designing other formulations or methods of manufacture for carrying out the same purposes of the present invention. It should also be realized by those skilled in the art that such equivalent constructions do no depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
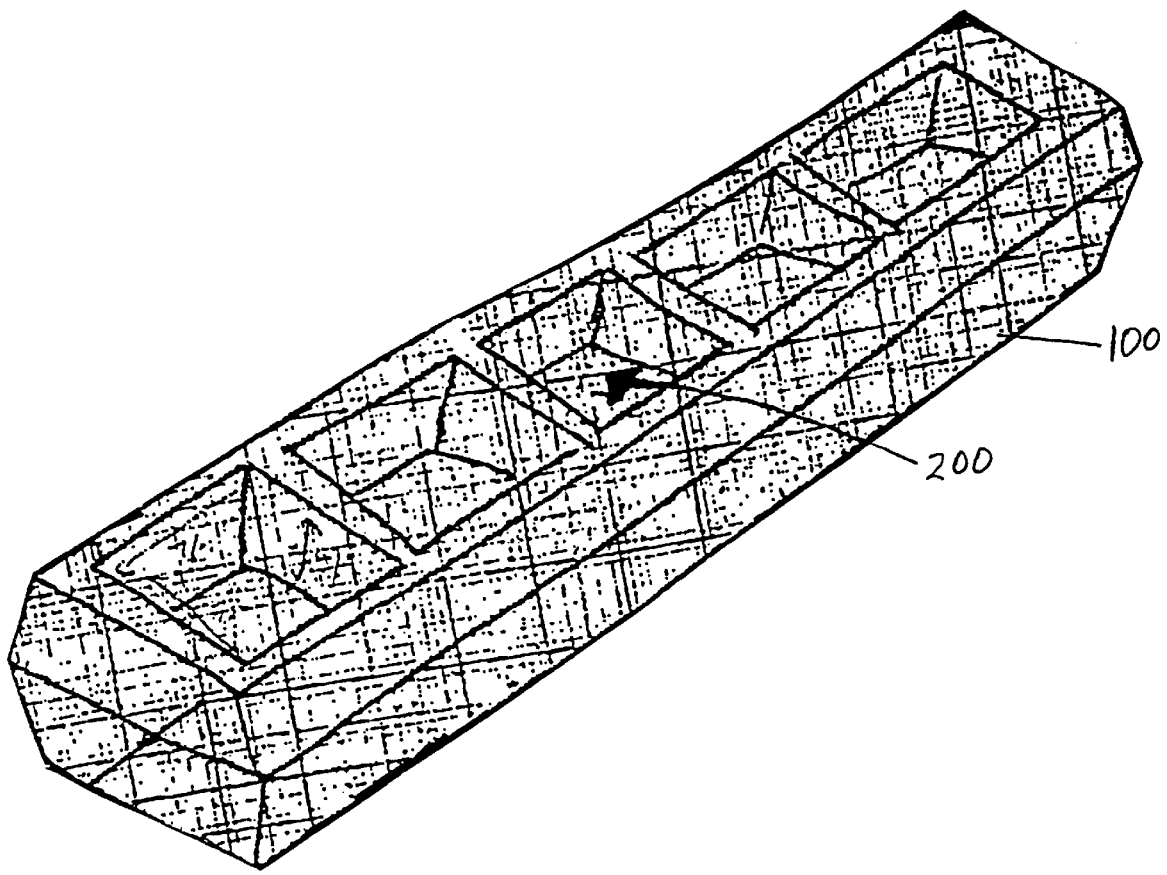
FIG. 1 is a perspective view of a preferred embodiment of the food product showing a plurality of indentations.

It is to be noted that the drawings illustrate only typical embodiments of the invention and are therefore not to be considered limiting of its scope, for the invention will admit to other equally effective embodiments.

DETAILED DESCRIPTION OF THE INVENTION

A. General Overview

The invention relates in part to a food product that has particular applicability in the restaurant business. The food product embodiment comprises a pre-baked cereal-based product to which is added a flavoring, either as a topping or as an inclusion, or both. The product is placed in appropriate packaging and shipped to its final destination in the fresh, shelf-stable (through use of appropriate preservatives), refrigerated, or frozen state. Upon receipt, the product is reconstituted by heating it to a desired temperature before eating.

The product embodiment of the invention may be a bread including corn bread, muffins, pastries, rolls, pancakes, waffles, waffle sticks, wafers, or cookies. A waffle stick is defined as a waffle in an elongated shape with a cross section that is generally rounded, oval, or angular. A waffle stick is suited to be held upright in the hand and eaten without a fork. The waffle stick may be held within a wrapper or mounted on a wooden stick for convenience of eating. Where the food product is a waffle or waffle stick, the pre-baked product is derived from a conventional waffle cereal-based product mix. When prepared, the food product may have a single indentation or a plurality of indentations or cavities formed on one or more of its exterior-most surfaces. In addition, or in the alternative, a plurality of inclusions may be imbedded in the food product.

As described herein, a flavoring is added to the indentations or cavities in the form of a topping and/or incorporated into inclusions that are imbedded in the pre-baked cereal-based product. Any flavoring suitable for use with the pre-baked cereal-based product may be used. Such flavorings include authentic maple syrup, molasses, honey, as well as fruit. In addition, artificial flavorings that simulate maple syrup, molasses, honey, or fruit may be used. Other suitable flavorings include mint, chocolate, or liqueurs. For example, the fruit, fruit flavorings, or artificial fruit flavorings could be strawberry, strawberry and cream, apple, cinnamon, apple cinnamon, raspberry, grape, grapefruit, pineapple, kiwi, banana, orange, cranberry, and the like, and combinations thereof. The food product is placed in appropriate packaging, and delivered to the targeted retail outlet or restaurant. The employees of the retail outlet or restaurant (or even the consumer himself) then heats the food product to its desired temperature. When properly heated, the flavoring does not significantly drip from or penetrate into the cooked product. More specifically, the inadvertent tilting or inverting of the product for short periods (less than about 20 or 30 seconds) does not result in loss of flavoring from the product. This lessens the possibility of any flavoring leaving the food product and landing on the consumer's clothing, automobile seats, or other personal effects.

The food product embodiment also has many benefits to the food service personnel of the quick service restaurant industry. For example, the food product is simple to prepare and serve, eliminates the need to serve individual packets or containers of syrup or flavorings, eliminates the need to supply knives or forks, and eliminates the trash and mess associated with the packets, eating utensils, napkins, and other clean-up materials.

B. Drawings—Food Products and Molds

FIG. 1 shows a perspective view of a preferred embodiment of a food product 100 of the present invention. While not wishing to be constrained to any particular dimensions, the food product 100 may be from about 1 to about 7 inches long, from about 1 to about 2 inches wide, and from about ½ to about 1½ inches tall. Preferably, the food product 100 is 5½ inches long, 1¼ inches wide, and 1 inch tall. As seen in FIG. 1, the food product 100 may include a single indentation or a plurality of indentations 200 on at least one exteriormost surface of the food product 100 capable of being filled with a flavoring. Numerous variations in the shape and dimensions of the food product 100 displayed in FIG. 1 and subsequent figures will be evident to those skilled in the art. For example, the food product 100 may be circular, triangular, square, or rectangular in shape or even planar, spherical, tubular, or oblong in shape, and may include a variety of indentations or protrusions (perhaps forming a unique design or graphic) that can be placed on the surface of the food product.

Figure 2:
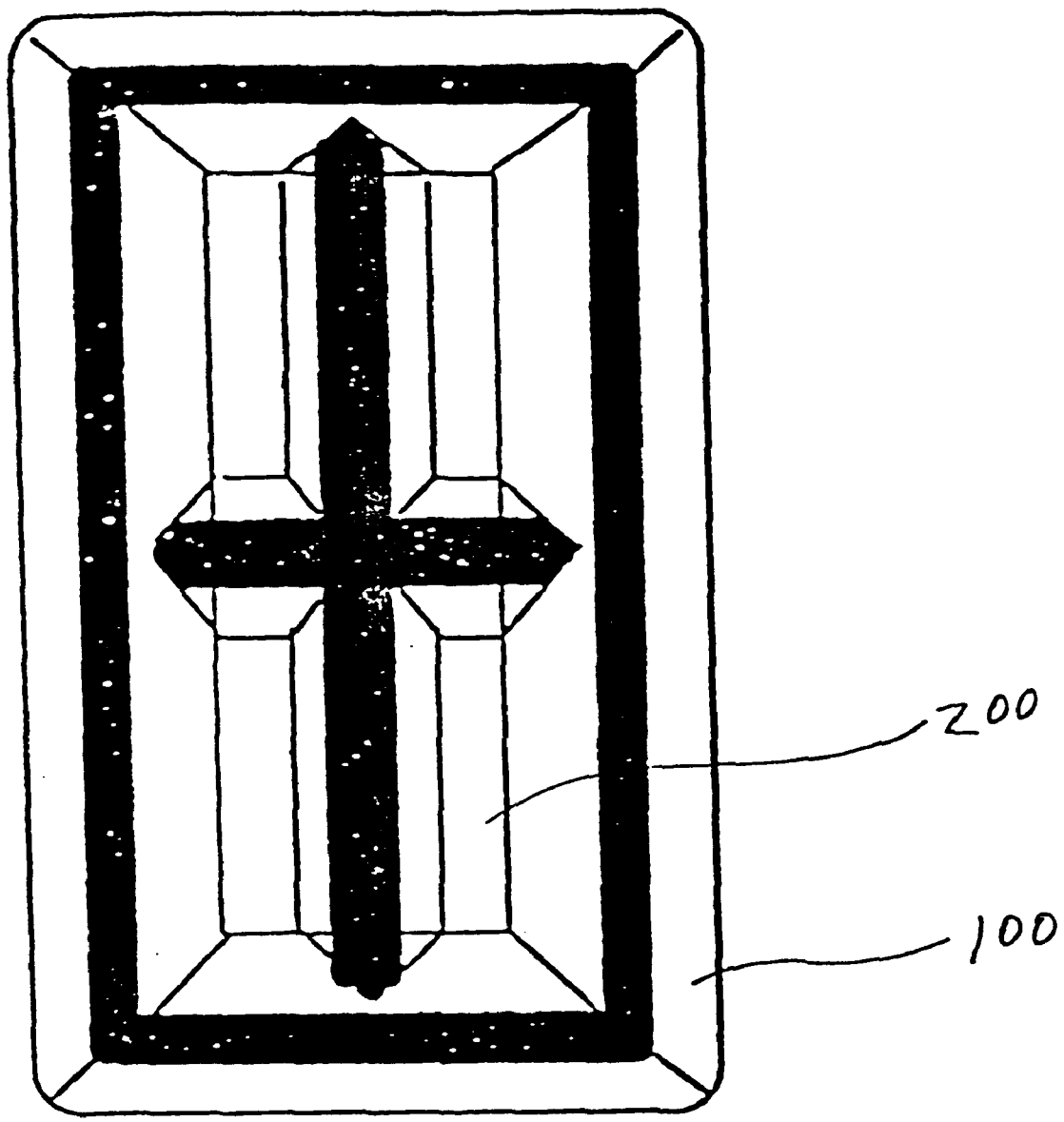
FIG. 2 is a top view of a preferred embodiment of the food product showing a plurality of indentations.

For example, FIG. 2 shows a top view of another embodiment of a food product 100. This embodiment represents a kids version or smaller version of the food product discussed above and may measure from about 1 to about 3 inches long, from about 1 to about 2 inches wide, and from about ½ to about 1½ inches tall. This embodiment also shows a plurality of indentations 200 capable of containing the flavoring toppings.

Figure 3:
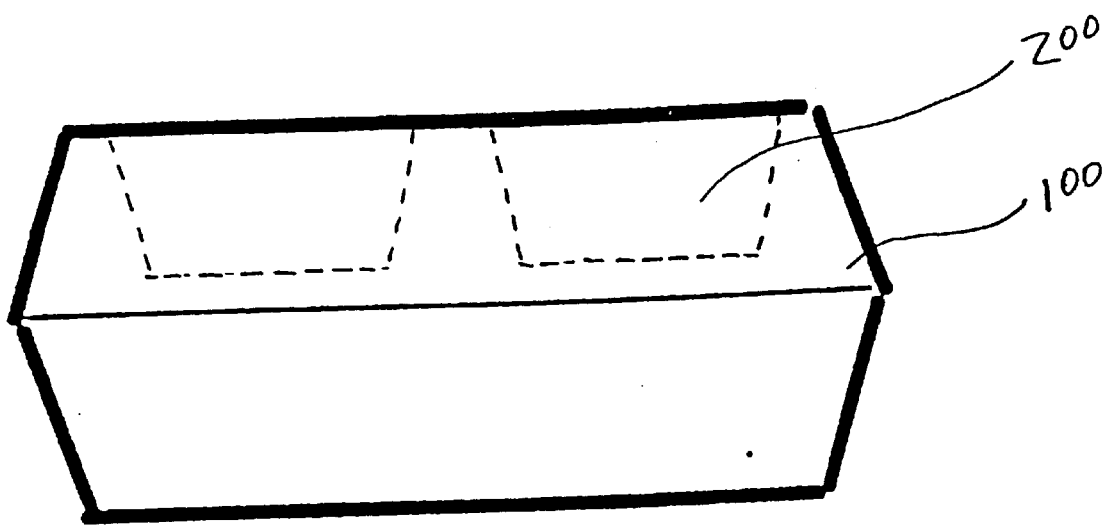
FIG. 3 is a side view of a preferred embodiment of the food product showing a plurality of indentations.

FIG. 3 is a side view of a preferred embodiment demonstrating a plurality of indentations 200. Depending upon the dimensions and other characteristics of the food product, the indentations are from about ☐ to about ☐ of an inch deep. While the specific number, size, and shape of the indentations varies with the particular mold selected by the manufacturer, as a general rule, the indentations should be formed so as not to cause structural problems in the food product being handled by the consumer. As shown in FIG. 3, the plurality of indentations 200 are on at least one exteriormost surface of the food product 100.

Figure 4:
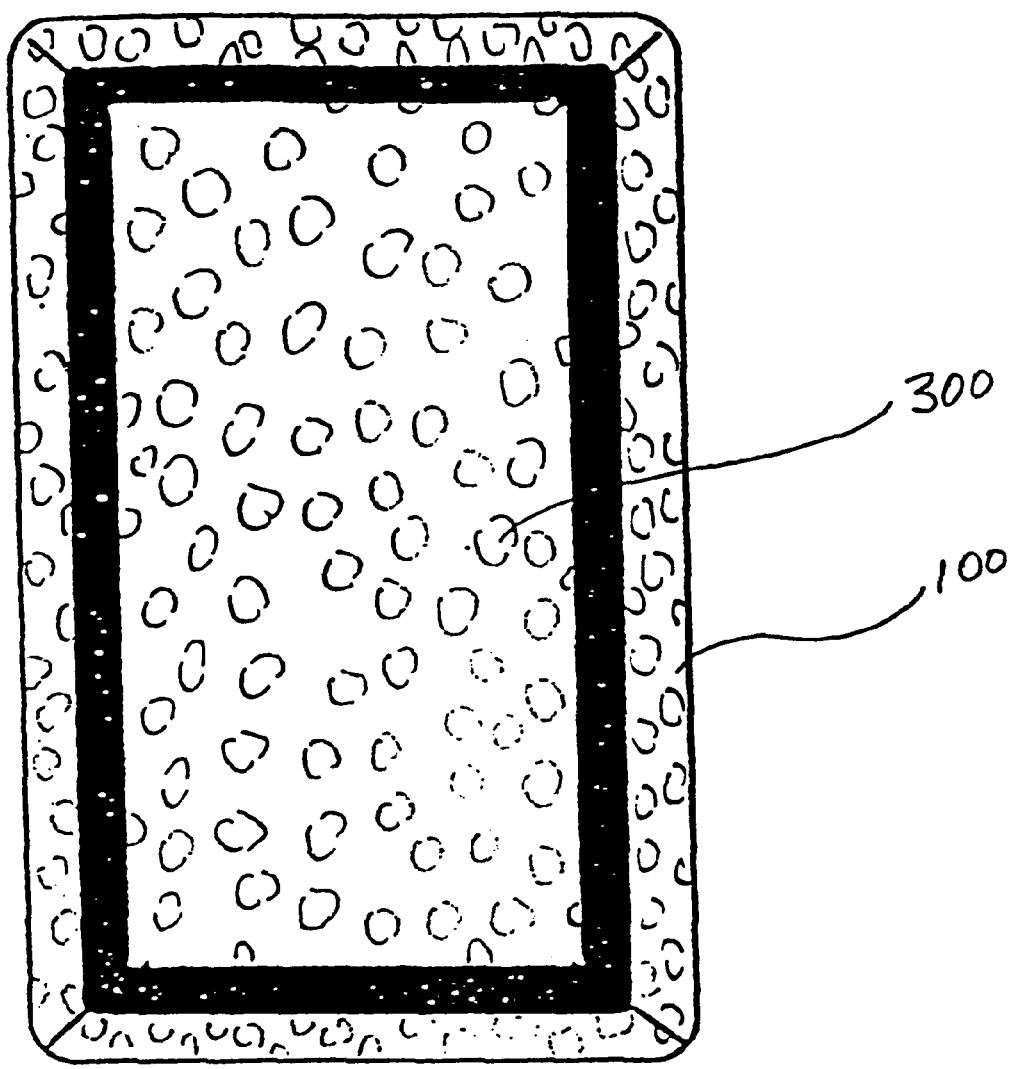
FIG. 4 is a top view of the preferred embodiment of the food product showing a plurality of flavoring inclusions.
Figure 5:
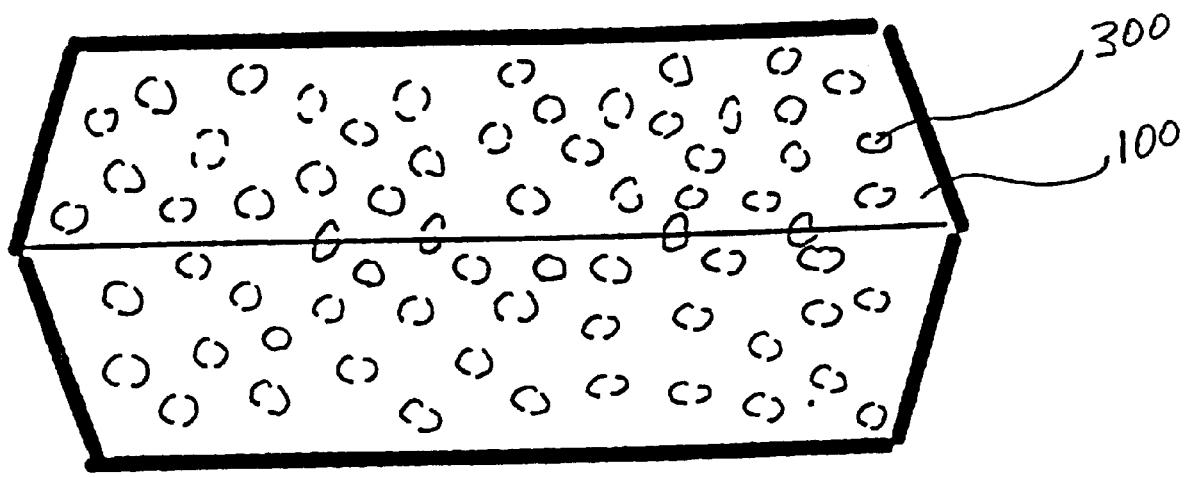
FIG. 5 is a side view of a preferred embodiment of the food product showing a plurality of flavoring inclusions.

Turning now to FIG. 4, there is shown a top view of another embodiment of the present invention. Instead of the indentations discussed above, the food product 100 contains a plurality of flavoring inclusions 300 dispersed randomly throughout the food product 100. FIG. 5 is a side view of a preferred embodiment. FIG. 5 shows the food product 100 containing a plurality of flavoring inclusions 300 randomly dispersed throughout the food product 100. As shown in FIGS. 4 and 5, the food product 100 does not have to have the indentations 200 to provide a flavoring. While not wishing to be constrained to any lower or upper limit on the number of inclusions that may appear in a particular food product 100, in general, the inclusions represent from about 1% to about 20% of the weight of the food product, preferably, from about 5% to about 10% of the weight. Any lower percentage, as appreciated by those skilled in the art, may result in some individual food products not having inclusions when prepared in a batch process. Any higher percentage, as appreciated by those skilled in the art, may result in loss of the food product matrix or other structural deficiencies to the food product. Of course, such percentages depend upon the size of the inclusions and the desired visual effect in the product.

Figure 6:
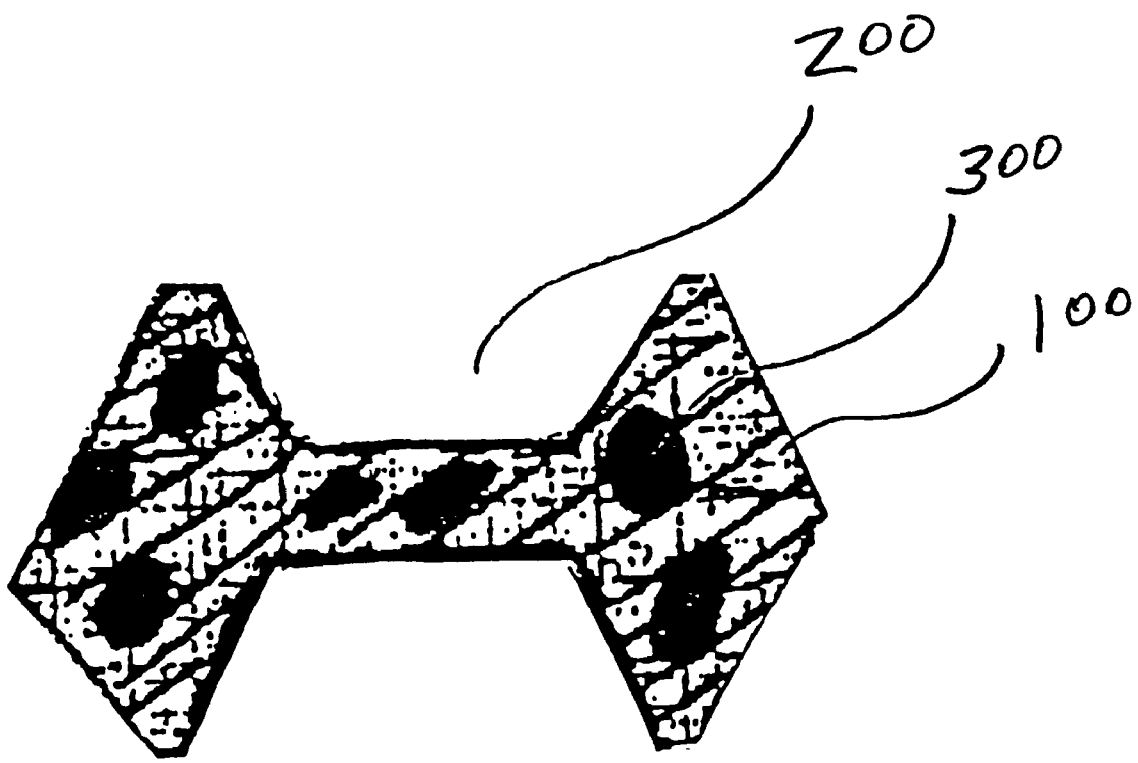
FIG. 6 is a cross-sectional side view of a preferred embodiment of the food product showing a combination of flavoring inclusions and a plurality of indentations.

FIG. 6 is a cross-sectional side view of a preferred embodiment of the food product 100. In this embodiment, both a plurality of indentations 200 and a plurality of flavoring inclusions 300 are contained within the food product 100. If desired, a flavoring can be applied to the indentations 200 as a topping to supplement the flavoring inclusions 300 randomly interspersed within the food product 100.

Figure 7:
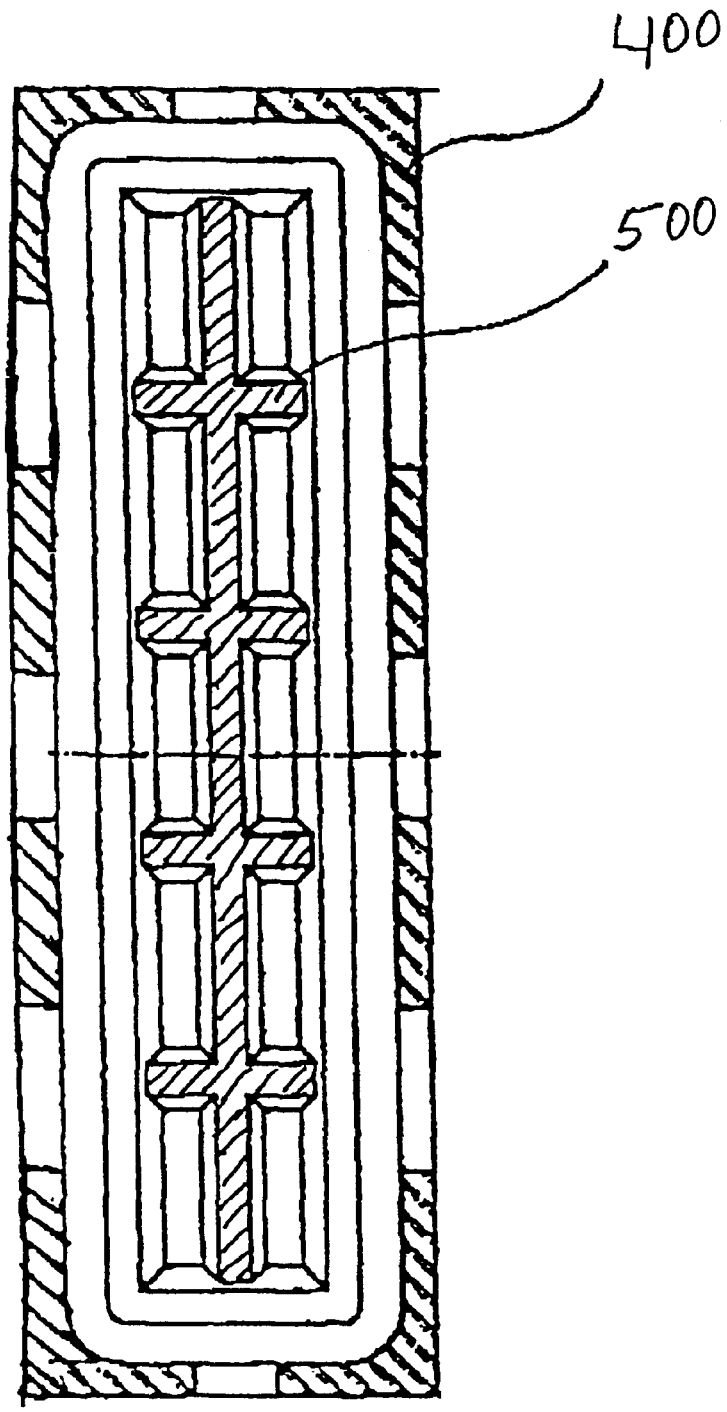
FIG. 7 is a top view of a preferred embodiment of the mold.
Figure 8:
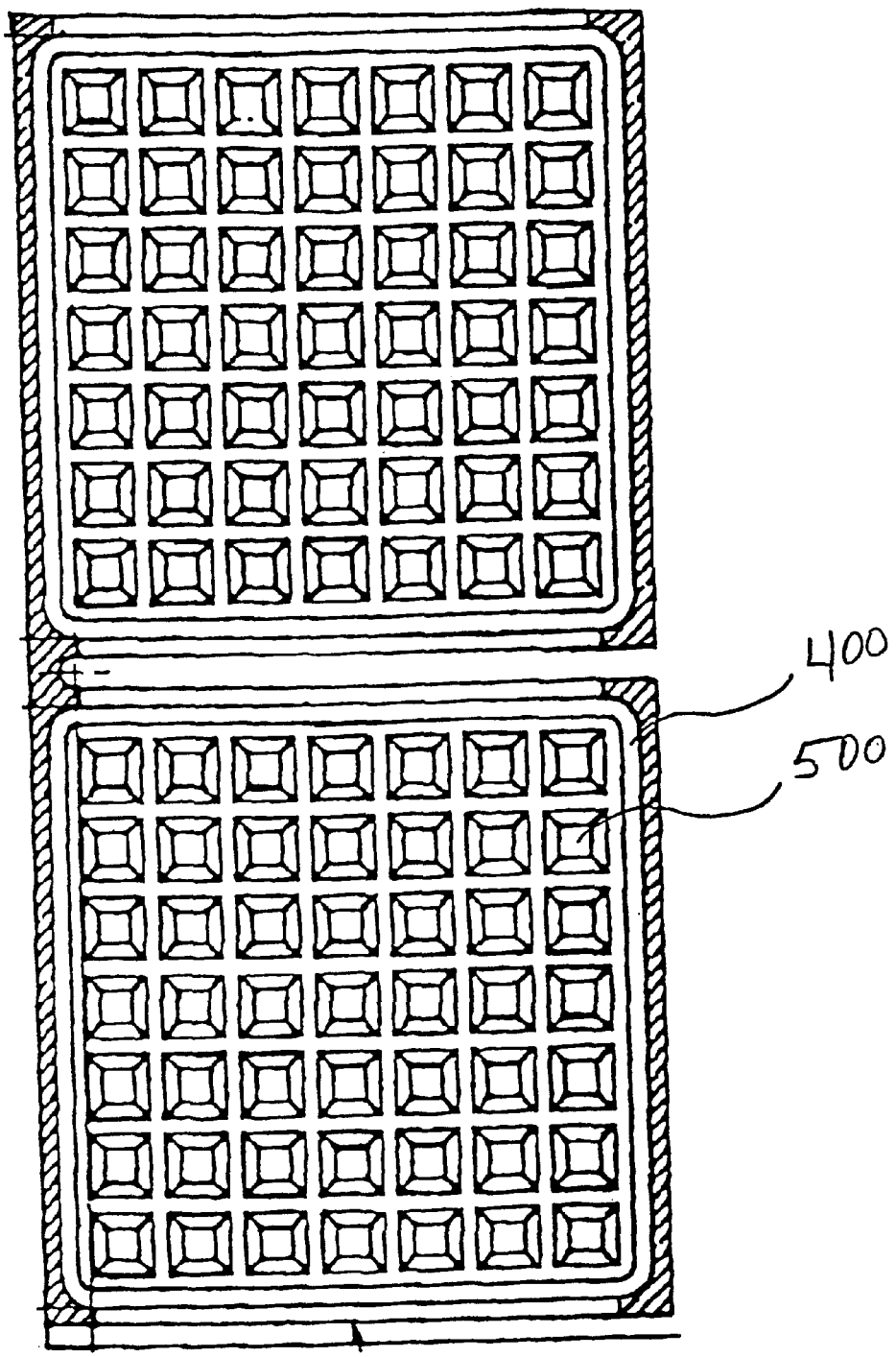
FIG. 8 is a top view of another embodiment of the mold.
Figure 9:
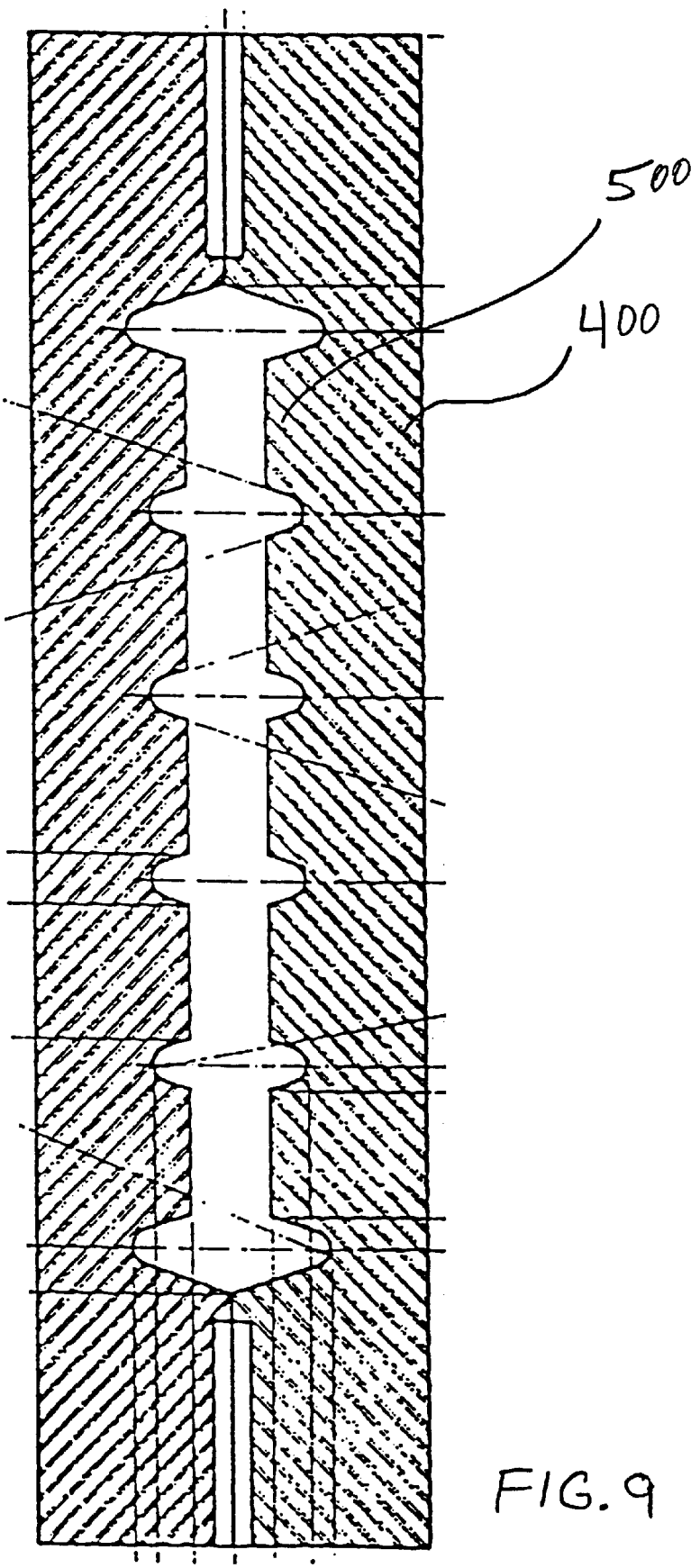
FIG. 9 is a cross-sectional side view of a preferred embodiment of the mold.

FIG. 7 is a top view of a preferred embodiment of a mold 400 that may be used to cook the food product 100 and create a plurality of indentations 200 in the food product 100. A plurality of protrusions 500 on the mold 400 creates the plurality of indentations 200 on the food product 100. FIG. 8 is a top view of another embodiment of the mold 400. As before, the plurality of protrusions 500 located on the mold 400 create the plurality of indentations 200 on the food product 100. FIG. 9 is a cross-sectional side view of a preferred embodiment of the mold 400. As before, a plurality of protrusions 500 creates the plurality of indentations 200 on the food product 100.

C. Waffle Batter

There is a wide variation in the formulations or recipes that can be used to prepare the cereal-based product or waffle batter (or more generally, the cereal-based batter or dough) of the present invention. For example, a general embodiment of the cereal-based product comprises the following ingredients:

| Ingredient | Weight Percentage |
| --- | --- |
| Water | 35–55 |
| Wheat Flour | 25–40 |
| Sugar | 0–12 |
| Vegetable or Animal Fat | 1–10 |
| Dairy Solids | 0–5 |
| Egg Solids | 0–5 |
| Baking Powder | 1–3 |
| Salt | 0–1 |
| Natural and/or Artificial Flavors | 0–1 |

A more preferred embodiment of the cereal-based product for a blueberry waffle or waffle stick comprises the following ingredients:

| Ingredient | Weight Percentage |
| --- | --- |
| Water | 44.8 |
| Wheat Flour | 31.6 |
| Sugar | 5.8 |
| Vegetable or Animal Fat | 5.3 |
| Dairy Solids | 4.4 |
| De-germed Corn Meal | 4.2 |
| Egg Whites (Solids) | 0.6 |
| Baking Powder | 1.6 |
| Salt | 1.0 |
| Natural and/or Artificial Flavors | 0.7 |
| Total | 100 |

Likewise, a more preferred embodiment of the cereal-based product for a traditional waffle or waffle stick comprises the following ingredients:

| Ingredient | Weight Percentage |
| --- | --- |
| Water | 33.0 |
| Wheat Flour | 32.6 |
| Sugar | 10.0 |
| Vegetable or Animal Fat | 2.0 |
| Dairy Solids | 4.0 |
| Whole Eggs (Liquid) | 15.0 |
| Egg Whites (Solids) | 0.6 |
| Baking Powder | 1.1 |
| Salt | 0.7 |
| Natural and/or Artificial Flavors | 1.0 |
| Total | 100 |

In general, to prepare the cereal-based batter or dough, all of the dry items are mixed and blended together in a container or vessel to form a uniform mix to which the liquid ingredients may then be added. If desired, for bulk operations, measured aliquots of the dry blend may be separated from a large bulk dry mix and then added to the liquid ingredients to form the cereal-based product. As to be more appreciated in the discussion below, the flavoring inclusions may also be added as dry ingredients to the mix at a ratio of from about 5% to about 20% by weight.

D. Flavoring Toppings

In addition to the formulations discussed above for the cereal-based product, the present invention also includes formulations for flavorings that may be added to the product in either the form of a topping or in the form of inclusions, or both. These flavorings have favorable physical states and properties that contribute to simulation of the sensory attributes associated with flavored table syrups and flowable toppings and yet make the food product tolerant to normal commercial frozen, refrigerated, and shelf-stable food distribution conditions. Specifically, one embodiment of the flavoring toppings that can be used on the exteriormost surfaces of the food product comprises the following ingredients:

| Ingredient | Weight Percentage |
| --- | --- |
| Water | 48.0 |
| Sugar | 35.0 |
| Brown Sugar | 13.6 |
| Modified Food Starch | 2.5 |
| Natural and/or Artificial Flavor | 0.7 |
| Caramel Color | 0.2 |
| Total | 100 |

Similarly, a preferred embodiment of a suitable flavoring is a maple-flavored topping comprising:

| Ingredient | Weight Percentage |
| --- | --- |
| Water | 33.0 |
| Dextrose | 30.0 |
| Light Brown Sugar | 13.7 |
| Sugar | 20.0 |
| Modified Food Starch | 2.5 |
| Natural and/or Artificial Flavor | 0.5 |
| Caramel Color | 0.3 |
| Total | 100 |

In a general sense, a preferred method of making the flavoring toppings comprises uniformly blending the previously enumerated ingredients and boiling the ingredients. The boiled flavoring is then cooled from about 90° F. (32° C.) to about 120° F. (49° C.). The natural and/or artificial flavor components are added, thoroughly mixed, and the flavoring is then applied to an exteriormost surface of the food product 100. The food product 100 is then frozen to about 5° F. (−15 ° C.) or less.

It should be appreciated to those skilled in the art that the composition of the natural and/or artificial flavors and the color could change depending upon the specific desires of the manufacturer of the flavoring. In addition, the sweetness level can be modified by the use of different types and quantities of nutritive sweeteners (including, but not limited to, dextrose, corn syrup, fructose, or sucrose) or non-nutritive sweeteners (including, but not limited to, aspartame, saccharine, acesulfame-k, or sucralose). For example, a preferred embodiment of the present invention for the flavoring toppings comprises the following formula:

| Ingredient | Weight Percentage |
| --- | --- |
| Water | 34.4 |
| Brown Sugar | 13.6 |
| Modified Food Starch | 2.3 |
| Xanthan Gum | 0.25 |
| Caramel Color | 0.20 |
| 55% High Fructose Corn Syrup (HFCS) | 45.46 |
| Maple Flavor | 0.57 |
| Butter Flavor | 0.22 |
| Gelatin, Type B, 250 Bloom, 8 Mesh | 0.75 |
| Water | 2.25 |
| Total | 100 |

The preferred blend procedure or method of manufacture for this maple-flavored topping is as follows:

1. Add 65.5-lb brown sugar, modified food starch, xanthan gum, and caramel color to an 80-quart Hobart bowl.
2. Mix these ingredients on low speed for 4 minutes.
3. Add water to a cooking kettle.
4. Add a 50-lb bag of brown sugar. Turn on mixer.
5. As syrup is mixing slowly, pour the sugar, starch, xanthan gum, and caramel color from the mixing bowl into the cooking kettle.
6. Add high fructose corn syrup to the kettle.
7. Turn on steam.
8. Set temperature gauge on panel for 210° F. (99° C.).
9. When the syrup reaches 210° F. (99° C.), turn off the steam and mixer.
10. Transfer the syrup through a plate heat exchanger to a holding tank. The temperature of the syrup should be from about 90° F. (32° C.) to about 120° F. (49° C.).
11. As the syrup is transferred to the holding tank, add flavors and gelatin hydrate solution.
12. When the syrup is above the agitator blades, turn on the agitator. Continue agitating for about 10 minutes after all syrup is transferred. Mix syrup manually with paddle to fully mix in flavors and gelatin.
13. Transfer the syrup to final holding tank after flavors have been mixed for 10 minutes. The heat exchanger should be bypassed for the transfer to the holding tank.

With respect to this last formulation, an initial step in making the flavoring toppings involves the combination of the 0.75 weight percent gelatin (type B) with the 2.25 weight percent water which in turn is heated from about 175° F. (79° C.) to about 195° F. (90° C.) to solubilize the gelatin. Specifically, the mixing and cooking procedure for the gelatin hydrate solution is as follows:

1. Add water to a hot-water jacketed kettle. The jacket water temperature should be from about 190° F. (88° C.) to about 210° F. (99° C.).
2. Add gelatin to water and mix with a wire whip.
3. Turn on heat and cook until the solution reaches 175° F. (79° C.).
4. Turn off heat and hold until ready to add solution to syrup base.

Yet another embodiment of the flavoring topping comprises a hydrocolloid. This preferred embodiment comprises the following ingredients and weight percentages:

| Ingredient | Weight Percentage |
| --- | --- |
| Water | 48.0 |
| Pectin (Low Methoxy) | 0.5 |
| Sugar | 37.0 |
| Brown Sugar | 13.6 |
| Monocalcium Phosphate | 0.03 |
| Natural and/or Artificial Flavor | 0.7 |
| Caramel Color | 0.17 |
| Total | 100 |

The method for making the preferred embodiment of the flavoring with a low methoxy pectin differs slightly from making the flavoring toppings with a starch. In this method, all of the previously enumerated ingredients except monocalcium phosphate are blended together and boiled. Once the ingredients are boiling, monocalcium phosphate is added. Calcium acts to set the viscosity of the system as known to those skilled in the art.

The above flavoring toppings have favorable physical states and properties that contribute to simulation of the sensory attributes associated with flavored table syrups and flowable toppings and yet make the food product tolerant to normal commercial frozen, refrigerated, and shelf-stable food distribution conditions. These physical states and properties include:

1. Having a nonfluid, immobile, semi-solid property at temperatures of about 0° F. (−18° C.) or below.
2. Having a nonfluid, immobile, semi-solid property at room temperature, from about 70° F. (21° C.) to about 80° F. (27° C.), or below, when thermoreversible gelling agent(s) such as gelatin, pectin, alginates, and/or gellan gum are included in the formulation.
3. Having a fluid property that simulates flavored table syrups and toppings at normal serving temperatures from about 90° F. (32° C.) to about 160° F. (71° C.), but does not significantly absorb into the food product or drip from the food product if eaten, cut, sliced, tilted, or inverted for periods of about 20 seconds or less.
4. More specifically, the topping has a fluid viscosity in the range from about 1,500 to about 10,000 centipoise at normal serving temperatures from about 90° F. (32° C.) to about 160° F. (71° C.), is not a foam, and will flow and drip when it is handled as a bulk fluid apart from its presence on the food product.

5. The lack of absorption or dripping of the topping when it is on the food product is due to the purposeful and appropriate combination of the following factors:
   a. Viscosity of the topping at normal serving temperatures.
   b. Surface tension of the topping at normal serving temperatures.
   c. Dimensional size/shape of the indentation(s) that contain a given volume of topping, The viscosity and/or surface tension of the topping at normal serving temperatures within the dimensions of the indentation(s) determines whether the topping will significantly drip or run from the food product if inverted for periods of about 20 seconds or less.
   d. Reconstitution of the food product with topping by heating until it just begins to boil. The bubbling at the surface of the topping creates a partially dehydrated thin film or skin that after cooling to normal serving temperatures, from about 90° F. (32° C.) to about 160° F. (71° C.), helps keep it from dripping if tilted or inverted for short periods of time (about 20 to 30 seconds). This thin, barely detectable film does not detract from the ability of the topping to simulate the sensory attributes of conventional flavored table syrups and flowable toppings.

E. Flavoring Inclusions

The flavorings of the present invention may also be presented with the food product in the form of a flavoring inclusion embedded within the food product itself. These flavoring inclusions may be used with or instead of the flavoring toppings. In one embodiment of the present invention, a plurality of flavoring inclusions 300 are added to a cereal-based product such that the flavoring inclusions 300 comprise from about 5% to about 20%, preferably 14%, weight percentage of the food product 100. These flavoring inclusions 300 comprise the following ingredients:

| Ingredient | Weight Percentage |
|---|---|
| Granulated Sugar and/or Brown Sugar | 30–40 |
| Dextrose | 25–35 |
| Shortening Flakes | 25–35 |
| Pre-gelatinized Starch | 2–8 |
| Natural and/or Artificial Flavors | 0.1–2.0 |
| Caramel Color | 0.01–0.5 |

In another preferred embodiment, the flavoring inclusions comprise:

| Ingredient | Weight Percentage |
|---|---|
| Granulated Sugar and/or Brown Sugar | 32.85 |
| Dextrose | 30.0 |
| Shortening Flakes | 30.0 |
| Pre-gelatinized Starch | 5.5 |
| Natural and/or Artificial Flavors | 1.35 |
| Caramel Color | 0.30 |
| Total | 100 |

In general, the formulations for the flavoring inclusions differ from the formulations for the flavoring toppings in that the shortening flakes act as plasticizers and agglomeration aids to facilitate manufacturing through an extrusion-type device. The formulations do not include water but instead rely on the water from the cereal-based batter or dough to which the inclusions are added as a dry ingredient. And as before, it should be appreciated to those skilled in the art that the composition of the natural and/or artificial flavors and the color could change depending upon the specific desires of the manufacturer of the flavoring. Likewise, the sweetness level can be modified by the use of different types and quantities of nutritive sweeteners (including, but not limited to, dextrose, corn syrup, fructose, or sucrose) or non-nutritive sweeteners (including, but not limited to, aspartame, saccharine, acesulfame-k, or sucralose).

The flavoring inclusions 300 can be prepared in a method similar to the method described in U.S. Pat. No. 3,671,264 to Drews et al. The contents of U.S. Pat. No. 3,671,264 are incorporated herein by reference in its entirety. In a preferred embodiment of the invention, the flavoring inclusions 300 are maple-flavored nugget inclusions approximately 3/16 inch in diameter and from about ☐ inches to about 1 inch in length. A unique feature of the inclusions is in regard to its simulation of conventional syrup properties when the cereal-based food product containing the inclusions are baked in a closed chamber device such as a griddle plate for making waffles. Elevated pressures, rapid heat transfer, and limited venting of steam from the food product in the baking chamber hydrates the modified food starch and sugars of the inclusions to the degree that they exhibit fluid characteristics and sensory attributes of conventional syrups within the crumb structure of the baked product. This feature differentiates the inclusions from the method in U.S. Pat. No. 3,671,264 which describes the inclusions as "lumps" that simulate fruit pieces or fruit jellies. Waffles, pancakes, corn breads, and other types of hand-held cakes baked similarly in a closed chamber griddle plate device will yield inclusions that at normal serving temperatures will simulate the sensory attributes of conventional table syrups and toppings.

D. Manufacturing the Food Products

A preferred method of preparing the food product 100 comprises pouring or dispensing a measured amount of the cereal-based product that may contain flavoring inclusions (for example, from about 40 g to about 60 g of batter, depending upon the size of the mold) into a mold 400 that is preheated from about 329° F. (165° C.) to about 392° F. (200° C.), preferably 347° F. (175° C.), and then baking the cereal-based product. Typically, the cereal-based product is baked in the mold from about 1 to about 4 minutes. The cooked cereal-based product may then be removed from the mold 400 by an appropriate extraction device known to those in the art, such as by needle extraction devices, gravity drops, or suction means. If desired, the product may be cooled on a continuous belt to a temperature of from about 95° F. (35° C.) to about 160° F. (71° C.). A measured amount of a flavoring (for example, from about 10 g to about 12 g of flavoring topping syrup per waffle) can then be applied to a plurality of indentations 200 on at least one exteriormost surface of the food product 100. The food product is then sent to a spiral freezer or a blast freezer until it is entirely frozen solid with an internal temperature of about 0° F. (−18° C.) or below. The food product 100 can be packaged, put in cases, and stored frozen until shipment or use.

E. Reconstituting the Food Products

Though many methods of reconstituting the food product 100 should be evident to those skilled in the art, a preferred method for reconstituting the food product 100 comprises re-heating the food product from a frozen state, from about −10° F. (−23° C.) to about 20° F. (−7° C.), or a thawed state, from about 20° F. (−7° C.) to about 80° F. (27° C.), preferably frozen, using a heating device, more preferably a convection oven set at about 375° F. (190° C.) from about 3 to about 9 minutes (depending upon the initial temperature and the number of food products or waffle sticks involved), such that upon removal the topping temperature of the food product 100 is from about 140° F. (60° C.) to about 180° F. (82° C.) and the internal temperature or waffle crumb temperature of the food product 100 is from about 122° F. (50° C.) to about 167° F. (75° C.). Other heating devices include convection ovens, toasting ovens, impingement ovens, infrared ovens, microwave ovens, ohmic ovens, induction ovens, or any other similar heating device known to those skilled in the art.

Alternatively, the flavoring toppings and/or the flavoring inclusions can be sold separately and applied to fresh-baked or prepared food products by consumers or employees of retail outlets or restaurants or used by food manufacturers in their cooking, baking, or manufacturing processes for a variety of food items.

As may be evident to those skilled in the art, the present invention can be adapted in other embodiments for use in other chemically-leavened food products, yeast-leavened food products, and unleavened food products including waffles, pancakes, corn breads, cookies, pastries, and wafers, containing flavorings and/or flavored product inclusions including maple, molasses, honey, or fruit-flavored flavoring inclusions and/or maple, molasses, honey, or fruit-flavored toppings applied to cavities, indentations, or wells 2 in the exteriormost surface of the food product 100. Chemically-leavened food products include breads, cakes, and muffins. Yeast-leavened food products include breakfast rolls, pastries, and breads. Unleavened food products include wafers and cookies. Of course, some of these items do not use molds, but use closed-chamber griddle devices or conventional baking techniques. Nevertheless, the application of the techniques discussed previously to chemically-leavened food products, yeast-leavened food products, and unleavened food products will be evident to those skilled in the art.

Additionally, alternative formula compositions for the flavoring toppings or the flavoring inclusions relate specifically to the thickening agent used, particularly, food grade soluble polymers used by those skilled in the art to adjust viscosity, texture, and mouthfeel of the food product 100. These food grade soluble polymers include food proteins (soy, egg, dairy, or animal), pectins, alginates, carageenans, xanthan gums, guar gums, carboxymethyl celluloses, and other hydrocolloids. These food grade soluble polymers may be used in place of native, modified, or pre-gelatinized starches at the appropriate level evident to those skilled in the art needed to simulate the appearance, viscosity, flow characteristics, and eating texture of flavored syrups and flavored toppings.

Having described various embodiments of the invention above, various modifications of the techniques, procedures, materials, and equipment will be apparent to those skilled in the art. It is intended that all such variations are within the scope and spirit of the appended claims and can be embraced thereby.

What is claimed is:

1. A flavoring inclusion to be imbedded within a cereal-based product that is baked in a closed chamber device comprising:
    between about 25 to about 35 weight percent shortening flakes;
    between about 2 to about 8 weight percent of pre-gelatinized starch;
    between about 0.1 to about 2 weight percent of a natural and/or artificial flavor; and
    wherein said flavoring inclusion does not drip if the food product is eaten, cut, sliced, tilted, or inverted for short periods or wherein the flavoring inclusion does not absorb significantly into the cereal-based product when heated.

2. The flavoring inclusion of claim 1 further comprising between about 30 to about 70 weight percent sweetener.

3. The flavoring inclusion of claim 2 wherein said sweetener is a nutritive sweetener selected from the group consisting of dextrose, corn syrup, high fructose corn syrup, liquid fructose, crystalline fructose, fruit juice concentrate, granulated sugar, or brown sugar.

4. The flavoring inclusion of claim 3 wherein said nutritive sweetener is substituted with a non-nutritive sweetener.

5. The flavoring inclusion of claim 1 further comprising between about 0.01 to about 0.5 weight percent of coloring.

6. A food product comprising:
    a pre-baked cereal-based product having a plurality of flavoring inclusions; and
    wherein the flavoring inclusions do not drip if the food product is eaten, cut, sliced, tilted or inverted for short periods or wherein the flavoring inclusions do not absorb significantly into the cereal-based product when heated.

7. The food product of claim 6 wherein the pre-baked cereal-based product is a waffle, pancake, cornbread, pastry, bread, cake, wafer, cookie, or muffin.

8. The food product of claim 6 wherein the flavoring inclusions comprise between about 0.1 to about 20 weight percent of the food product.

9. The food product of claim 6 wherein the flavoring inclusions comprise between about 5 to about 15 weight percent of the food product.

10. The food product of claim 6 wherein the flavoring inclusions simulate maple-flavored syrup, molasses, honey, or fruit-flavored syrup.

11. The food product of claim 6 wherein the flavoring inclusions comprise:
    between about 25 to about 35 weight percent shortening flakes;
    between about 2 to about 8 weight percent of pre-gelatinized starch;
    between about 0.1 to about 2 weight percent of a natural and/or artificial flavor.

12. The food product of claim 11 further comprising between about 30 to about 40 weight percent sweetener.

13. The food product of claim 12 wherein the sweetener is a nutritive sweetener selected from the group consisting of dextrose, corn syrup, high fructose corn syrup, liquid fructose, crystalline fructose, fruit juice concentrate, granulated sugar, or brown sugar.

14. The food product of claim 13 wherein the nutritive sweetener is substituted with a non-nutritive sweetener.

15. The food product of claim 11 further comprising between about 0.01 to about 0.5 weight percent of coloring.

16. A method of preparing a food product which comprises:
    dispensing a predetermined amount of flavoring inclusions comprising:
        between about 25 to about 35 weight percent shortening flakes;
        between about 2 to about 8 weight percent of pre-gelatinized starch: and between about 0.1 to about 2 weight percent of a natural and/or artificial flavor;

baking the batter or dough; and wherein the flavoring inclusions do not drip when the food product is eaten, cut, sliced, tilted, or inverted for short periods or wherein the flavoring inclusions do not absorb significantly into the cereal-based product.

17. A pancake comprising:

a pre-baked cereal-based product containing a plurality of flavoring inclusions wherein the flavoring inclusions do not drip if the pancake is eaten, cut, sliced, tilted, or inverted for short periods or wherein the flavoring inclusions do not absorb significantly into the pancake when heated.

18. A flavoring inclusion to be imbedded within a cereal-based product that is baked in a closed chamber device comprising:

between about 25 to about 35 weight percent shortening flakes;

between about 2 to about 8 weight percent of pre-gelatinized starch; and between about 0.1 to about 2 weight percent of a natural and/or artificial flavor.

19. The flavoring inclusion of claim 18 further comprising between about 30 to about 70 weight percent sweetener.

20. The flavoring inclusion of claim 19 wherein said sweetener is a nutritive sweetener selected from the group consisting of sucrose, dextrose, corn syrup, high fructose corn syrup, liquid fructose, crystalline fructose, fruit juice concentrate, honey, maple syrup, molasses, granulated sugar, liquid sugar, or brown sugar.

21. The flavoring inclusion of claim 19 wherein said sweetener is a non-nutritive sweetener.

22. The flavoring inclusion of claim 18 further comprising between about 0.01 to about 0.5 weight percent of coloring.

23. A food product comprising:

a pre-baked cereal-based product having a plurality of flavoring inclusions, said inclusions comprising
between about 25 to about 35 weight percent shortening flakes;
between about 2 to about 8 weight percent of pre-gelatinized starch; and
between about 0.1 to about 2 weight percent of a natural and/or artificial flavor.

24. The food product of claim 23 wherein the pre-baked cereal-based product is a waffle, pancake, cornbread, pastry, bread, cake, wafer, cookie, or muffin.

25. The food product of claim 23 wherein the flavoring inclusions comprise between about 0.1 to about 20 weight percent of the food product.

26. The food product of claim 23 wherein the flavoring inclusions comprise between about 5 to about 15 weight percent of the food product.

27. The food product of claim 23 wherein the flavoring inclusions simulate maple-flavored syrup, molasses, honey, or fruit-flavored syrup.

28. The food product of claim 23 further comprising between about 30 to about 40 weight percent sweetener.

29. The food product of claim 28 wherein the sweetener is a nutritive sweetener selected from the group consisting of dextrose, corn syrup, high fructose corn syrup, liquid fructose, crystalline fructose, fruit juice concentrate, granulated sugar, or brown sugar.

30. The food product of claim 28 wherein the sweetener is a non-nutritive sweetener.

31. The food product of claim 23 further comprising between about 0.01 to about 0.5 weight percent of coloring.

32. A method of preparing a food product which comprises:

measuring a pre-determined amount of cereal-based product containing a plurality of flavoring inclusions, said inclusions comprising
between about 25 to about 35 weight percent shortening flakes;
between about 2 to about 8 weight percent of pre-gelatinized starch; and
between about 0.1 to about 2 weight percent of a natural and/or artificial flavor; and
cooking the cereal-based product.

33. The method of preparing the food product of claim 32 wherein the weight percent of the flavoring inclusions within the food product is between about 0.1 to about 15 weight percent.

34. The method of preparing a food product of claim 32 wherein the flavoring inclusions simulate maple-flavored syrup, molasses, honey, or fruit-flavored syrup.

35. The method of claim 32 further comprising reheating the cereal-based product until an internal temperature of the food product is between about 50° C. to about 75° C.

36. A method of preparing a food product which comprises:

dispensing a predetermined amount of flavoring inclusions comprising:
between about 25 to about 35 weight percent shortening flakes;
between about 2 to about 8 weight percent of pre-gelatinized starch; and
between about 0.1 to about 2 weight percent of a natural and/or artificial flavor; and baking the batter or dough.

37. A pancake comprising:

a pre-baked cereal-based product containing a plurality of flavoring inclusions, said inclusions comprising
between about 25 to about 35 weight percent shortening flakes;
between about 2 to about 8 weight percent of pre-gelatinized starch; and between about 0.1 to about 2 weight percent of a natural and/or artificial flavor.

\* \* \* \* \*